US008680028B2

(12) United States Patent
Braun et al.

(10) Patent No.: US 8,680,028 B2
(45) Date of Patent: *Mar. 25, 2014

(54) METHOD FOR THE TREATMENT OF ROCK FORMATIONS AND NOVEL POLYAMPHOLYTES

(75) Inventors: Olivier Braun, Castres (FR); Paul Mallo, Croissy-sur-Seine (FR); Alain Zaitoun, Paris (FR)

(73) Assignees: Societe d'Exploitation de Produits pour les Industries Chimiques SEPPIC, Paris (FR); Poweltec, Rueil Malmaison (FR)

( * ) Notice: Subject to any disclaimer, the term of this patent is extended or adjusted under 35 U.S.C. 154(b) by 324 days.

This patent is subject to a terminal disclaimer.

(21) Appl. No.: 12/997,144

(22) PCT Filed: Jun. 2, 2009

(86) PCT No.: PCT/FR2009/051030
§ 371 (c)(1),
(2), (4) Date: Feb. 2, 2011

(87) PCT Pub. No.: WO2010/001002
PCT Pub. Date: Jan. 7, 2010

(65) Prior Publication Data
US 2011/0118152 A1 May 19, 2011

(30) Foreign Application Priority Data

Jun. 10, 2008 (FR) ...................................... 08 53846

(51) Int. Cl.
*C09K 8/68* (2006.01)
(52) U.S. Cl.
USPC ........... 507/224; 507/219; 507/221; 507/222; 507/223; 507/225; 507/255; 166/305.1
(58) Field of Classification Search
None
See application file for complete search history.

(56) References Cited

U.S. PATENT DOCUMENTS

| 4,726,906 | A | 2/1988 | Chen et al. | |
| 6,531,561 | B2 | 3/2003 | Candau et al. | |
| 7,462,363 | B2 * | 12/2008 | Braun et al. | 424/401 |
| 8,263,533 | B2 * | 9/2012 | Tabary et al. | 507/221 |

FOREIGN PATENT DOCUMENTS

| EP | 0082657 A2 | 6/1983 |
| EP | 0122073 A1 | 10/1984 |
| EP | 1113029 A1 | 7/2001 |
| WO | WO 2006024795 A3 * | 8/2006 |

OTHER PUBLICATIONS

Zhang, Xiaohong et al: "Study on the preparation and performance of multigroup-cooperated superabsorbent polymer" Database CA [Online] Chemical Abstracts Service, Jul. 28, 2006, Columbus, Ohio, US; XP090009009.
International Search Report, Dated Nov. 5, 2009, in PCT/FR2009/051030.

* cited by examiner

*Primary Examiner* — John J Figueroa
(74) *Attorney, Agent, or Firm* — Young & Thompson

(57) ABSTRACT

A method for the treatment of rock formations which may or may not be underground and, more particularly, of oil or gas production wells, water-injection wells intended to flood hydrocarbon (oil or gas) reservoirs or gas mines or gas storage wells includes a step of injecting, into the rock formation or well, a microgel obtained by dilution in water of a self-invertible inverse latex or of a self-invertible inverse microlatex of a crosslinked polyelectrolyte, obtained by copolymerization, in the presence of a crosslinking agent of partially- or totally-salified free 2-methyl-2-[(1-oxo-2-propenyl)amino]-1-propanesulfonic acid, with at least one cationic monomer chosen from: 2,N,N,N-tetramethyl-2-[(1-oxo-2-propenyl)amino]propanammonium chloride; N,N,N-trimethyl-3-[(1-oxo-2-propenyl)amino]propanammonium chloride; diallyldimethylammonium chloride; N,N,N-trimethyl-2-[(1-oxo-2-propenyl)]ethanammonium chloride; N,N,N-trimethyl-2-[(1-oxo-2-methyl-2-propenyl)]ethanammonium chloride; or N,N,N-trimethyl-3-[(1-oxo-2-methyl-2-propenyl)amino]propanammonium chloride; and with at least one neutral monomer chosen from: acrylamide; N,N-dimethylacrylamide; N-[2-hydroxy-1,1-bis(hydroxymethyl)-ethyl] propenamide; or 2-hydroxyethyl acrylate.

20 Claims, No Drawings

METHOD FOR THE TREATMENT OF ROCK FORMATIONS AND NOVEL POLYAMPHOLYTES

FIELD OF THE INVENTION

A subject matter of the present invention is novel inverse latex and inverse microlatex polymers and their use in preparing thickening and/or stabilizing and/or selective microgels for reducing the permeability of wells in the field of the oil and gas industry (hydrocarbons $CO_2$), in particular Water Influx Prevention, Profile Control, Sand Influx Prevention and Enhanced Oil Recovery.

BACKGROUND OF THE INVENTION

The processes for Water Influx Prevention, applied to oil or gas producing wells, make possible a lasting lowering in the fraction of water produced by the well and an increase in the production of oil or gas, if the overall production of the well can be maintained or increased. Polymers are sometimes employed but these remain limited to relatively low permeabilities of water-producing zones (on average less than 300 milliDarcy), because of the limitation in size of these polymers. As they are, in addition, mechanically, thermally and chemically unstable, they are rarely used alone and generally stabilizing and/or crosslinking agents are added to them. It is preferable to use gels formed of polymers, whether lost circulation gels or dilute gels (thus having a low concentration of polymer and of crosslinking agent). The polymer/crosslinking agent mixture is then injected into the well to be treated with delayed gelling kinetics, the gel only setting after a few hours in the formation around the well. However, these processes are regarded as not very reliable and often use polluting products based on chromium salts or resins. Furthermore, the processes based on gels do not make it possible to control either the gelling kinetics or the consistency of the gel; they engender a high risk of damage to the well, they bring about the retention and the adsorption of the crosslinking agent on the reservoir rock and they make it possible only with difficulty to place the gel in the water zones and to prevent the invasion of the oil or gas zones.

European patent applications EP 0 082 657 and EP 0 122 073 and U.S. Pat. No. 4,726,906 disclose the use of polyampholytes in the treatment of oil wells.

The increasing number of mature fields and the development of complex wells (horizontal wells, offshore wells, multibranched wells), combined with the lack of reliability of the techniques for the separation of bottom sediments, have rendered highly advantageous self-selective treatments for Water Influx Prevention, that is to say treatments which can be injected throughout the open interval of the well (bullhead injection), without using mechanical means for treating localized zones. In the case of such self-selective treatments, as the oil or gas beds are not protected during injection, it is essential to inject a formulation which has little effect on the permeability to oil or to gas. Water-soluble polymers or weak gels of water-soluble polymers, which are products referred to as RPMs (Relative Permeability Modifiers), greatly reduce the permeability to water of the rocks while having little effect on the permeability to oil or to gas. They act by forming an adsorbed layer of polymer at the wall of the pores, which remains swollen as water passes but contracts under the effect of the capillary forces as oil or gas passes. A good RPM product should thus be strongly and irreversibly adsorbed on the rock and should form a layer thickness well suited to the pore size, should have a good mechanical, chemical and thermal stability and should have a "soft" consistency which allows it to easily contract as oil or gas passes.

In the self-selective (bullhead) treatment, it is also essential for the placement of the product injected into the various beds to be optimized. The operator will seek to minimize the depth of penetration into the oil or gas beds, so as to preferentially invade the water beds. The placement can be controlled either by the use of diversion products which make it possible to temporarily protect the oil or gas zones, i.e. by virtue of a property inherent in the RPM agent, for example by choosing a product sufficiently large in size (a few microns) not to penetrate the oil beds (generally the least permeable).

When the processes of Water Influx Prevention are applied to water injection wells, this application, also known as "Profile Control Treatment", makes it possible, by injecting a product of polymer or polymer gel type into the drain holes of high permeability, to achieve better flushing of the reservoir and to prevent the water channeling phenomenon currently observed in heterogeneous reservoirs. As indicated above, microgels, due to their large size, will spontaneously invade preferentially the drain holes of highest permeability, in which the water moves, and will only to a very small extent spread into the zones of low permeability, which are the most saturated in oil. For this reason, they exhibit superior placement properties to those of the polymers.

As regards Sand Influx Prevention, the oil and gas industry sometimes uses resin-based formulations. The resin-curing agent mixture is injected diluted in a hydrocarbon solvent into the zone to be treated around the well. The setting time is sufficiently delayed to allow injection of the products under low pressure. The well is subsequently closed in order to allow the resin to cure and to consolidate the rock. Once cured, the resin behaves as a solid. It is therefore essential, if it is desired to keep the fluids flowing in the treated zone, either to add, to the formulation, a chemical agent which makes it possible to form channels in the resin or else to inject an inert gas during curing. However, the resin-based processes for Sand Influx Prevention are not used to any great extent as they employ organic compounds which are often not very safe and toxic; their setting kinetics are difficult to control. The interval treated cannot exceed a few feet in thickness and one to two feet in depth and the risks of damage to the well are high.

Enhanced Hydrocarbon Recovery by injection of polymers consists in thickening the injected water by addition of low concentrations of hydrophilic polymers, so as to provide better control of the mobility of the displacing fluid (water) with respect to the displaced fluid (hydrocarbon). The polymer most widely used for this application is an acrylamide/acrylate copolymer which is linear and of high molecular weight, the viscosifying power of which is very high and which is not adsorbed to any great extent on the reservoir rock. However, this type of polymer is not very stable above 70° C., is not very stable to shearing and is highly sensitive to salts, which bring about a significant reduction in its viscosifying power.

SUMMARY OF THE INVENTION

The inventors have thus attempted to develop novel compounds which can be employed to prepare thickening and/or stabilizing and/or selective microgels for reduction in permeability of wells in the field of the oil industry and which exhibit improved properties, more particularly in terms of Water Influx Prevention, Profile Control, Sand Influx Prevention and Enhanced Oil Recovery.

This is why, according to a first aspect, a subject matter of the invention is a process for the treatment of underground or nonunderground rock formations and more particularly of oil or gas producing wells, of water injection wells targeted at flushing hydrocarbon (oil or gas) reservoirs or of mine gas wells or of gas storage wells, characterized in that it comprises a stage of injection onto, or into, said rock formation or into said well of the microgel obtained by diluting, in water, a self-invertible inverse latex or a self-invertible inverse microlatex of a crosslinked polyelectrolyte obtained by copolymerization, in the presence of a crosslinking agent, of free, partially salified or completely salified 2-methyl-2-[(1-oxo-2-propenyl)amino]-1-propanesulfonic acid, of at least one cationic monomer chosen from 2,N,N,N-tetramethyl-2-[(1-oxo-2-propenyl)amino]propanammonium chloride (AMPTAC), N,N,N-trimethyl-3-[(1-oxo-2-propenyl)amino]propanammonium chloride (APTAC), diallyldimethylammonium chloride (DADMAC), N,N,N-trimethyl-2-[(1-oxo-2-propenyl)]ethanammonium chloride, N,N,N-trimethyl-2-[(1-oxo-2-methyl-2-propenyl)]ethanammonium chloride or N,N,N-trimethyl-3-[(1-oxo-2-methyl-2-propenyl)amino]propanammonium chloride (MAPTAC), and of at least one neutral monomer chosen from acrylamide, N,N-dimethylacrylamide, N-[2-hydroxy-1,1-bis(hydroxymethyl)ethyl]propenamide or 2-hydroxyethyl acrylate.

In the process as defined above, the self-invertible inverse latex or the self-invertible inverse microlatex employed results, after swelling in aqueous fluids, in microgels which can be deformed, which are temperature stable, which are mechanically stable, when they are subjected to high shear, and which are irreversibly adsorbed.

The term "copolymerization" means, in the process as defined above, that the polymerization reaction employs at least three different monomers. However, it can involve more than three different monomers.

According to a specific aspect of the present invention, the self-invertible inverse latex optionally employed in the process as defined above comprises from 20 to 70% by weight and preferably from 25 to 60% by weight of crosslinked polyelectrolyte.

According to another specific aspect of the present invention, the self-invertible inverse microlatex optionally employed in the process as defined above comprises from 15 to 40% by weight and preferably from 20 to 30% by weight of said polyelectrolyte.

According to another specific aspect of the process as defined above, said inverse latex or said inverse microlatex is dried and atomized beforehand before being diluted in water to form said microgel.

According to this specific aspect, said inverse latex or said inverse microlatex is concentrated beforehand before drying and atomizing.

Another subject matter of the invention is a self-invertible inverse latex comprising from 20 to 70% by weight and preferably from 25 to 60% by weight of a crosslinked polyelectrolyte obtained by copolymerization of free, partially salified or completely salified 2-methyl-2-[(1-oxo-2-propenyl)amino]-1-propanesulfonic acid, of N,N,N-trimethyl-3-[(1-oxo-2-propenyl)amino]propanammonium chloride and of at least one neutral monomer chosen from acrylamide, N,N-dimethylacrylamide, N-[2-hydroxy-1,1-bis(hydroxymethyl)ethyl]propenamide or 2-hydroxyethyl acrylate and a self-invertible inverse microlatex comprising from 15 to 40% by weight and preferably from 20 to 30% by weight of a crosslinked polyelectrolyte obtained by copolymerization of free, partially salified or completely salified 2-methyl-2-[(1-oxo-2-propenyl)amino]-1-propanesulfonic acid, of N,N,N-trimethyl-3-[(1-oxo-2-propenyl)amino]propanammonium chloride and of at least one neutral monomer chosen from acrylamide, N,N-dimethylacrylamide, N-[2-hydroxy-1,1-bis(hydroxymethyl)ethyl]propenamide or 2-hydroxyethyl acrylate.

In the definition of the process and in the definitions of the self-invertible inverse latex and of the self-invertible inverse microlatex, which are subject matters of the present invention, the term "partially salified" or "completely salified" means, in the context of the present invention, that the 2-methyl-2-[(1-oxo-2-propenyl)amino]-1-propanesulfonic acid (also known as 2-acrylamido-2-methylpropanesulfonic acid or AMPS™) is respectively partially salified or completely salified in the form of an alkali metal salt, such as, for example, the sodium salt or the potassium salt, or of an ammonium salt.

In the definition of the process as defined above and in the definitions of the self-invertible inverse latex and of the self-invertible inverse microlatex, which are subject matters of the present invention, the term "crosslinked polyelectrolyte" denotes a nonlinear polyelectrolyte which is provided in the form of a three-dimensional network which is insoluble in water but which can swell in water and which thus results in a chemical gel being obtained.

According to a specific aspect of the process, of the self-invertible inverse latex and of the self-invertible inverse microlatex, which are subject matters of the present invention, the crosslinking agent is chosen from compounds comprising at least two ethylenic bonds and very particularly from diallyloxyacetic acid or one of its salts and more particularly its sodium salt, triallylamine, diallylurea, trimethylolpropane triacrylate, ethylene glycol dimethacrylate, diethylene glycol diacrylate, methylenebis(acrylamide) or a mixture of several of these compounds.

According to a specific aspect of the process, of the self-invertible inverse latex and of the self-invertible inverse microlatex, which are subject matters of the present invention, the crosslinking agent is employed in the molar proportion, expressed with respect to the monomers employed, of 0.001 to 0.5% and preferably of 0.005 to 0.25%.

According to another specific aspect of the process, of the self-invertible inverse latex and of the self-invertible inverse microlatex, which are subject matters of the present invention, the proportion of 2-methyl-2-[(1-oxo-2-propenyl)amino]-1-propanesulfonic acid monomer unit in the polyelectrolyte is between 1 and 75 mol %, more particularly between 5 and 40 mol %.

According to another specific aspect of the process, of the self-invertible inverse latex and of the self-invertible inverse microlatex, which are subject matters of the present invention, the proportion of neutral monomer unit in the polyelectrolyte is between and 90 mol % and more particularly between 50 and 70 mol %.

According to another specific aspect of the process, of the self-invertible inverse latex and of the self-invertible inverse microlatex, which are subject matters of the present invention, the proportion of cationic monomer unit in the polyelectrolyte is between 1 and 75 mol %, more particularly between 3 and 30 mol %.

DETAILED DESCRIPTION OF THE INVENTION

The self-invertible inverse latex optionally employed in said process and the self-invertible inverse latex, which is a subject matter of the present invention, comprise an emulsifying system of water-in-oil (W/O) type composed either of just one surfactant or of a mixture of surfactants, provided that said mixture has an HLB value which is sufficiently low to bring about water-in-oil emulsions. There are, as emulsifying agent of water-in-oil type, for example, sorbitan esters, such as sorbitan oleate, such as that sold by Seppic under the name Montane™ 80, sorbitan isostearate, such as that sold by Seppic under the name Montane™ 70, or sorbitan sesquioleate, such as that sold by Seppic under the name Montane™ 83. There are also some polyethoxylated sorbitan esters, for example pentaethoxylated sorbitan monooleate, such as that sold by Seppic under the name Montanox™ 81, or pentaethoxylated sorbitan isostearate, such as that sold under the name Montanox™ 71 by Seppic. There is also diethoxylated oleocetyl alcohol, such as that sold under the name Simulsol™ OC 72 by Seppic, tetraethoxylated lauryl acrylate, such as that sold under the name Blemmer™ ALE 200, or polyesters with a molecular weight of between 1000 and 3000 produced from the condensation between a poly(isobutenyl-succinic acid) or its anhydride and a polyethylene glycol, such as Hypermer™ 2296, sold by Uniqema, or, finally, block copolymers with a molecular weight of between 2500 and 3500, such as Hypermer™ B246, sold by Uniqema, or Simaline™ IE 200, sold by Seppic.

The self-invertible inverse latex optionally employed in said process and the self-invertible inverse latex, which is a subject matter of the present invention, more particularly comprise from 2 to 8% by weight of emulsifying system of water-in-oil (W/O) type.

The inverse latex optionally employed in said process and the self-invertible inverse latex, which is a subject matter of the present invention, comprise an emulsifying system of oil-in-water (O/W) type composed either of just one surfactant or of a mixture of surfactants, provided that said mixture has an HLB value which is sufficiently high to bring about oil-in-water emulsions. There are, as emulsifying agent of oil-in-water type, for example, ethoxylated sorbitan esters, such as polyethoxylated sorbitan oleate with 20 mol of ethylene oxide, sold by Seppic under the name of Montanox™ 80, or polyethoxylated sorbitan laurate with 20 mol of ethylene oxide, sold by Seppic under the name of Montanox™ 20, polyethoxylated castor oil with 40 mol of ethylene oxide, sold under the name Simulsol™ OL50, decaethoxylated oleodecyl alcohol, sold by Seppic under the name Simulsol™ OC 710, heptaethoxylated lauryl alcohol, sold under the name Simulsol™ P7, or polyethoxylated sorbitan monostearate with 20 mol of ethylene oxide, sold by Seppic under the name Montanox™ 60.

The self-invertible inverse latex optionally employed in said process and the self-invertible inverse latex, which are subject matters of the present invention, comprise more particularly from 3 to 8% by weight of an emulsifying system of oil-in-water (O/W) type.

The self-invertible inverse microlatex optionally employed in the process which is a subject matter of the present invention and the self-invertible inverse microlatex, which are subject matters of the present invention, comprise an emulsifying system capable of ensuring the formation of self-invertible inverse microlatexes, that is to say a surfactant system comprising at least one surfactant of water-in-oil (W/O) type, such as, for example, sorbitan esters, such as sorbitan oleate, such as that sold by Seppic under the name Montane™ 80, sorbitan isostearate, such as that sold by Seppic under the name Montane™ 70, or sorbitan sesquioleate, such as that sold by Seppic under the name Montane™ 83, and at least one surfactant of oil-in-water (O/W) type, such as, for example, ethoxylated sorbitan esters, such as ethoxylated sorbitan hexaoleates, such as 61096, G 1086 and G 1087 sold by Uniqema, said system capable of ensuring the formation of self-invertible inverse microlatexes having a total HLB number of greater than or equal to 8.5 and of less than or equal to 11 and preferably of greater than or equal to 9.5 and of less than or equal to 10.

Within the meaning of the present invention, the HLB number is calculated by the formula $HLB=20.(1-I_s/I_a)$, in which $I_s$ represents the saponification number of the emulsifying system and $I_a$ the acid number of the starting fatty acid or of the mixture of starting fatty acids, as described by N. Schönfeld in the section entitled "Surface active ethylene oxide adducts", page 228.

The self-invertible inverse microlatex optionally employed in the process which is a subject matter of the present invention and the self-invertible inverse microlatex, which are subject matters of the present invention, more particularly comprise between 8 and 20% by weight of surface-active agents.

According to another specific aspect of the present invention, the constituent oil of the oil phase of the self-invertible inverse latex or of the self-invertible inverse microlatex employed in the process as defined above and/or which are subject matters of the present invention is generally chosen from commercial mineral oils comprising saturated hydrocarbons, such as paraffins, isoparaffins or cycloparaffins, exhibiting at ambient temperature a density between 0.7 and 0.9 and a boiling point of greater than approximately 250° C., such as, for example, Marcol™ 52, Isopar™ M or Isopar™ L, which are sold by Exxon Chemical;

isohexadecane, identified in Chemical Abstracts by the number RN=93685-80-4, which is a mixture of $C_{12}$, $C_{16}$ and $C_{20}$ isoparaffins comprising at least 97% of $C_{16}$ isoparaffins, among which the main constituent is 2,2,4,4,6,8,8-heptamethylnonane (RN=4390-04-9); it is sold in France by Bayer; or isododecane, also sold in France by Bayer.

The oil phase more particularly represents from 15 to 40% and preferably from 20 to 25% of the total weight of the self-invertible inverse latex optionally employed in the process as defined above and/or which is a subject matter of the present invention and the aqueous phase represents from 2 to 40% of its total weight.

The oil phase represents from 25 to 50% and preferably from 30 to 40% of the total weight of the self-invertible inverse microlatex optionally employed in the process as defined above and/or which is a subject matter of the present invention and the aqueous phase represents from 15 to 50% of its total weight.

According to a more specific aspect of the present invention, a subject matter of the latter is a self-invertible inverse latex or a self-invertible inverse microlatex of a crosslinked terpolymer of 2-methyl-2-[(1-oxo-2-propenyl)amino]-1-propanesulfonic acid, partially or completely salified in the sodium salt form, of acrylamide and of N,N,N-trimethyl-3-[(1-oxo-2-propenyl)amino]propanammonium chloride.

The self-invertible inverse latex and the self-invertible inverse microlatex are prepared by methods known to a person skilled in the art.

The self-invertible inverse latex is prepared by the process comprising:
  the preparation of an aqueous phase comprising, inter alia, the monomers and at least one crosslinking agent and optionally various technological additives, such as chain-limiting agent or complexing agent for metal entities,
  the preparation of an organic phase comprising, inter alia, the oil and the emulsifying system of water-in-oil type,
  the introduction of the aqueous phase into the fatty phase with stirring and then subjecting to the action of strong shearing using a device of Ultra-Turrax or Silverson type, the polymerization reaction under nitrogen sparging, initiated in the presence of an initiating agent for free radicals, the addition of the emulsifying system of oil-in-water type.

Such a process is described, for example, in European patent application EP 1 047 716.

The self-invertible inverse microlatex is prepared by the process comprising:

the preparation of an aqueous phase comprising, inter alia, the monomers and at least one crosslinking agent and optionally various technological additives, such as chain-limiting agent or complexing agent for metal entities, the preparation of an organic phase comprising, inter alia, the oil and the surfactant system capable of forming an inverse microemulsion, then the introduction of the aqueous phase into the fatty phase with stirring, the polymerization reaction under nitrogen sparging, initiated in the presence of an initiating agent for free radicals.

Such a process is described, for example, in European patent application EP 1 371 692.

According to another aspect, a subject matter of the invention is a process for the preparation of microgels by dilution in water of a self-invertible inverse latex or of a self-invertible inverse microlatex of a crosslinked polyelectrolyte, which are subject matters of the present invention.

In the process as defined above, the dilution is carried out in a water, preferably of moderate salinity, preferably with a salinity of less than or equal to 2% TDS (Total Dissolved Salt), and if necessary with stirring, in order to break the emulsion. The water employed is generally process water or a mixture of process water and of softer water (river water, running water) or any other type of satisfactory water having the desired salinity.

The pH for use of the present composition will lie in a range between 4 and 11, preferably between 5 and 9.

The degree of dilution of the polyampholyte according to the process as defined above is generally between 0.01% by weight and 2.00% by weight, expressed as weight of copolymer with respect to the total weight of the solution.

The relatively low degree of crosslinking of the polyampholyte which is a subject matter of the present invention makes it possible to confer a high elasticity and thus a high ability to deform on the microgels. Microgels of this type are described as "deformable" (soft microgels), in contrast to microgels having a high degree of crosslinking, which would resemble hard spheres. These microgels exhibiting a high degree of ability to deform make them good potential RPM agents (Relative Permeability Modifiers).

According to a final aspect, a subject matter of the invention is a process for the treatment of underground or nonunderground rock formations and more particularly of oil or gas producing wells, of water injection wells targeted at flushing hydrocarbon (oil or gas) reservoirs or of mine gas wells or of gas storage wells, characterized in that it comprises a stage of injection into onto said rock formation or into said well of the microgel obtained by dilution in water of a self-invertible inverse latex or of a self-invertible inverse microlatex of a crosslinked polyelectrolyte, which are subject matters of the present invention.

The treatment of wells of this type is carried out over a limited thickness on the surface of the well (a few meters). It relates to the prevention of water influxes, the prevention of gas influxes and the prevention of sand influxes. It can also relate to the control of profiles, flushing-enhanced recovery (chemical flooding), from injection wells, the consolidation of sands, plugging treatments (mineshafts) or for the shutdown of zones.

The treatment of the well carried out results in the formation of a polymeric hydrophilic film which covers the surface of the rock and which thus prevents it from eroding.

Depending on the type of well, it may be judicious to inject a preflush (water, polymer alone, diversion fluid, and the like) before injecting the solution of microgels.

According to a specific aspect of the process, the treatment as defined above applies to wells or to reservoirs having a temperature between 10° C. and 200° C., preferably between 20° C. and 150° C.

According to a specific aspect of the process, the treatment as defined above applies to reservoirs having a salinity of between 0 g/l and 350 g/l TDS, preferably between 0 g/l and 100 g/l TDS.

The main advantages of the "hydrophilic film" technique in comparison with the consolidation by resins are as follows:

The use of nontoxic water-soluble compounds;

The use of RPM products, which make it possible to naturally allow the oil or the gas to pass.

The possibility of treating any open interval over high thicknesses and depths of several meters.

The favored placement in the most permeable zones, which generally produce the most sand and/or water.

The microgels according to the invention exhibit a high adsorption energy. They have a greater mechanical, chemical and thermal stability and make it possible to form a thick adsorbed layer and thus a thicker protective film than that formed by a linear polymer of high molecular weight.

They allow much easier control of the treated well and limit the risks of plugging, which are much lower than with gelling formulations or resins.

Subsequent to the treatment carried out with microgels, when the well is brought back into production, a reduction in the permeability to oil or to gas may, however, occur in the hydrocarbon zone. However, once the injected fluid (solution of microgels) is reproduced, the latter is replaced with the hydrocarbon. Due to the capillary pressure alone, the microgels, which are deformable in nature, are then compressed at the wall of the pore restrictions, thus allowing the hydrocarbon phase to flow towards the producing well without a detrimental change in its relative permeability.

The following examples illustrate the invention without, however, limiting it.

EXAMPLE 1

Preparation of a Self-Invertible Inverse latex of AMPS/µM/APTAC (38.5/58.5/3) terpolymer crosslinked with MBA (predominantly anionic polyampholyte)

An organic phase is prepared by introducing 27.5 g of sorbitan oleate (for example Montane™ 80) into 220 g of Exxsol™ D100, composed of a mixture of cycloparaffinic and paraffinic hydrocarbons. 0.1 g of azobisisobutyronitrile is added thereto.

At the same time, an aqueous phase is prepared by introducing:

50 g of water,
124 g of acrylamide (AM),
481.2 g of a 55% commercial solution of the sodium salt of 2-acrylamido-2-methylpropanesulfonic acid (AMPS),
24.8 g of a 75% commercial solution of acrylamidopropyl-N,N,N-trimethylammonium chloride (APTAC), 0.02 g of methylenebisacrylamide (MBA), 0.45 g of a 40% commercial solution of sodium diethylenetriaminepentaacetate.

The pH of the aqueous phase is adjusted to 5.3 by adding the required amount of 2-acrylamido-2-methylpropanesulfonic acid (approximately 1 g).

The total amount of aqueous phase is then adjusted to 682 g by addition of water.

The aqueous phase is subsequently dispersed with stirring in the oil phase and then subjected to the action of high shearing using a turbine of Ultra-Turrax or Silverson type. The inverse emulsion thus obtained is then subjected to sparging with nitrogen, so as to remove the dissolved oxygen. After having cooled the inverse emulsion to approximately 10° C., the polymerization reaction is initiated by addition of the oxidation/reduction couple: cumene hydroperoxide/sodium metabisulfite. The temperature rises up to approximately 80° C. The polymerization reaction is subsequently allowed to continue until a temperature stationary phase is obtained, indicating the end of the reaction. The reaction medium is then maintained at this temperature, so as to remove the residual monomers, and then 50 g of 7-mol ethoxylated lauryl alcohol are added at approximately 35° C. Filtration is carried out and the inverse latex thus obtained is collected.

EXAMPLE 2

Preparation of a Powder Formed of AMPS/AM/APTAC (38.5/58.5/3) terpolymer crosslinked with MBA The operation is carried out as in example 1, the Exxsol™ D 100 in the organic phase being replaced with Isopar™ M. The expected self-invertible inverse latex is obtained and is dried by atomizing with an atomizer, for example a DF520B device manufactured by ICF Industrie CIBEC (Maranello, Italy), in order to obtain the expected powder.

EXAMPLE 3

Preparation of a Self-Invertible Inverse microlatex of AMPS/AM/APTAC (38.5/58.5/3) terpolymer crosslinked with MBA (predominantly anionic polyampholyte)

The following are introduced with stirring into a polymerization reactor:
389 g of Isopar™ M ($C_{13}/C_{14}$ isoparaffin),
31.3 g of Montane™ 80 (sorbitan oleate),
108.7 g of Montanox™ 85 [Ethoxylated sorbitan trioleate comprising 20 mol of ethylene oxide (20 EO)],
336.1 g of a 55% commercial solution of the sodium salt of 2-acrylamido-2-methylpropanesulfonic acid (AMPS),
86 g of acrylamide (AM),
17.1 g of a 75% solution of acrylamidopropyltrimethylammonium chloride (APTAC),
0.16 g of methylenebisacrylamide (MBA).

The polymerization is carried out after sparging with nitrogen using the redox couple: cumene hydroperoxide and sodium metabisulfite. After maintaining the reaction medium at the final polymerization temperature for the time necessary for the reduction of the residual monomers, the expected microlatex is recovered after cooling and filtration.

EXAMPLE 4

Preparation of a Powder Formed of AMPS/AM/APTAC (38.5/58.5/3) terpolymer crosslinked with MBA The self-invertible inverse microlatex prepared in example 3 is dried using an atomizer, for example a DF520B device manufactured by ICF Industrie CIBEC (Maranello, Italy), in order to obtain the expected powder.

EXAMPLE 5

Preparation of a Self-Invertible Inverse latex of AMPS/AM/APTAC (10/60/30) terpolymer crosslinked with MBA (predominantly cationic polyampholyte)

The procedure is carried out as in example 1, the following charges being introduced into the aqueous phase:
150 g of deionized water,
130 g of acrylamide (AM),
125 g of a 55% commercial solution of the sodium salt of 2-acrylamido-2-methylpropanesulfonic acid (AMPS),
233 g of a 75% commercial solution of acrylamidopropyltrimethylammonium chloride (APTAC),
0.02 g of methylenebisacrylamide (MBA),
0.45 g of a 40% commercial solution of sodium diethylenetriaminepentaacetate.

The pH of the aqueous phase is adjusted to 4 and the aqueous phase is made up to 682 g by addition of deionized water. An organic phase is prepared by introducing 27.5 g of Montane™ 80 (sorbitan oleate) into 220 g of Isopar™ M. 0.1 g of azobisisobutyronitrile is added thereto.

EXAMPLE 6

Preparation of a Powder Formed of AMPS/AM/APTAC (10/60/30) terpolymer crosslinked with MBA The self-invertible inverse latex prepared in example 5 is dried using an atomizer, for example a DF520B device manufactured by ICF Industrie CIBEC (Maranello, Italy), in order to obtain the expected powder.

EXAMPLE 7

Evaluation of the Properties of Microgels Starting from the Inverse Latex Prepared According to Example 1

The microgel under consideration, referred to as Microgel A, comprises 37 mol % of anionic functional groups and 3 mol % of cationic functional groups. It was subjected to a series of tests comparable to those described in example 5 of French patent application FR 2 874 617, relating to a microgel prepared according to the same method of preparation comprising 40% of anionic functional groups of the same nature and no cationic fraction and referred to here as Microgel B.
1—Measurement of Viscosities Solutions of Microgel A with different concentrations of the inverse latex prepared as according to example 1 were prepared in a water comprising 2% of NaCl.

The viscosities obtained at 30° C. (in mPa·s) at the different concentrations C in water are listed in the following table (Low Shear Rheometer, shear rate equal to 1 s$^{-1}$ and to 100 s$^{-1}$):

| Concentration of inverse latex (% by weight) | Viscosities of the emulsions (mPa · s) | |
| --- | --- | --- |
| | Shear rate: 1 s$^{-1}$ Microgel B | Shear rate: 100 s$^{-1}$ Microgel A |
| 0.3 | 2.8 | 2.3 |
| 0.5 | 14 | 11 |
| 0.6 | 24 | 19 |
| 0.77 | 54 | 36 |

These results reveal that the viscosities of the solutions of Microgel A are lower than the viscosities of the solutions of Microgel B at the same concentrations and in the same solvent.

2—Tests on Silicon Carbide

The evaluation of the performances of a solution of Microgel A (concentration=0.1% by weight in water comprising 2% of NaCl) in a porous medium is carried out on silicon carbide masses with a particle size of 50 and 80 µm. The silicon carbide powder is packed down in a column equipped with two tips. Its initial permeability k is determined to water. The fluids (water, solution of microgels, elution water, oil, and the like) are injected into the porous medium at a constant flow rate. The pressure drop is determined at the boundaries of the mass and recorded throughout the injection. Good propagation of the Microgel A solutions (monitored by an inline viscosity measurement) is confirmed in both types of SiC masses. The adsorption is measured by the difference in propagation of two fronts of microgels separated by a flushing with water. The reduction in mobility Rm is measured during the injection of the microgel solution into the mass. The reductions in permeability to water or to oil are determined by the alternating injection of these two fluids subsequent to the injection of the microgel solution. The reduction in permeability to water makes it possible, knowing the pore size of the porous medium, to evaluate the thickness of the adsorbed layer of microgels and thus to determine the size of the microgels in their adsorbed form. A selective reduction in permeability is found, with a significant reduction in the permeability to water (Rkw) without a significant reduction in the permeability to oil (Rko) (K: Darcy permeability; H: Thickness of adsorbed layer, in micrometers).

Experimental conditions: Temperature T=30° C.; water+2% of NaCl; (viscosity: 0.85 mPa·s), Oil: Marcol™ 52 (viscosity 8.6 mPa·s), Concentration of Microgel A: 0.1% by weight.

| | K (Darcy) | Adsorption (µg/g) | Rm | Rkw | Rko | H (µm) |
| --- | --- | --- | --- | --- | --- | --- |
| SiC 50 µm | 1.1 | 150 | 6.5 | 4.7 | 1.2 | 1.5 |
| SiC 80 µm | 2.8 | 123 | 5.0 | 2.2 | 1.2 | 1.3 |

These results reveal that Microgel B (anionic) exhibits adsorption levels lower by approximately 30% with respect to those of Microgel A in the same porous media, Rkw levels greater by approximately 20% and Rm values lower by approximately 20%, the Rko values remaining very low.

3—Tests on Berea Sandstone

The experimental conditions are identical to those of the preceding test.

| | K (Darcy) | Adsorption (µg/g) | Rm | Rkw | Rko | H (µm) |
| --- | --- | --- | --- | --- | --- | --- |
| Berea sandstone | 0.15 | 150 | 10 | 25 | 1.2 | 1.4 |

The behavior of the Microgel A here again indicates a very selective reduction in the permeability to water with respect to the permeability to oil, and an adsorption level which is high and greater than that of the Microgel B (of approximately 50% on Berea sandstone).

4—Determination of the Size of the Microgels B by Light Scattering (Photon Correlation Spectroscopy)

The size determined is of the order of 1.7 µm (concentration of microgels of 0.1% by weight) and confirms the orders of magnitude obtained during the injection into the silicon carbide masses and into the Berea sandstone. It should be noted that the size of the Microgel A is approximately 15% lower than that of the Microgel B.

5—Thermal Stability

A test on maintaining at 150° C. under pseudoanaerobic conditions for a time of three months without loss in viscosity demonstrates the excellent thermal stability of the Microgel A. This property, also confirmed with the Microgel B, is explained by the presence of internal crosslinking points (Experimental conditions: water+2% NaCl, concentration of microgels=0.3%).

6—Mechanical Stability

The Microgel A withstands high shear stresses. This is because no loss of viscosity is observed after shearing at 10 000 revolutions/min (Ultra-Turrax™) for 10 minutes.

Experimental conditions: water+2% NaCl, ambient temperature, concentration of microgels=0.3%.

7—Stability to Electrolytes

The Microgel A is virtually insensitive to the salinity in a range from 20 to 200 g/l TDS, in the presence or absence of divalent ions.

Experimental conditions: ambient temperature, concentration of microgels=0.1%.

8—Stability to pH

The Microgel A is virtually insensitive to the pH in a range between 4 and 11.

Experimental conditions: ambient temperature, concentration of microgels=0.1%.

9—Flocculating Power

The test is carried out on crushed Berea sandstone provided in the form of a sand with a particle size of between 1 and 300 µm. A mineralogical analysis indicates a proportion of silica of approximately 70% and of kaolinite of 12%. The test is carried out according to the following experimental protocol. 20 g of sand and 200 ml of 2% NaCl brine are introduced into a 250 ml graduated measuring cylinder. 50 ppm of Microgel A are subsequently introduced and the measuring cylinder is inverted three times, so as to thoroughly mix the combined mixture. The time for separation by settling between the levels 160 and 80 ml is subsequently measured. The test is preceded by a blank without addition of Microgel. The results of a comparative test between the Microgel A and the Microgel B are given in the Table below. It shows that the flocculating power of the Microgel A with regard to the sand is very powerful and greater than the flocculating power of the Microgel B. This test indicates a high ability of the Microgel A to be adsorbed on the sandstone and to prevent the movements of fines.

| Test | Time for separation by settling (second) |
|---|---|
| Blank | 83 |
| Microgel A | 7 |
| Microgel B | 14 |

EXAMPLE 8

Evaluation of the Properties of the Microgels Starting from the Inverse Latex Prepared According to Example 5

The microgel under consideration, which is referred to as Microgel C (cationic dominant characteristic), was subjected to comparative tests with the Microgel A (anionic dominant characteristic). To do this, an injection into Berea sandstone was carried out according to the experimental protocol described in the preceding example and a flocculation test was carried out on crushed Berea sandstone. The results are collated in the following two tables.

| Test of injection into Berea sandstone | K (Darcy) | Adsorption (µg/g) | Rm | Rkw | Rko | H (µm) |
|---|---|---|---|---|---|---|
| Microgel A | 0.15 | 150 | 30 | 25 | 1.2 | 1.4 |
| Microgel C | 0.19 | 230 | 51 | 41 | 4.2 | 2.0 |

| Flocculation test | Time for separation by settling (second) |
|---|---|
| Blank | 83 |
| Microgel A | 7 |
| Microgel C | 4 |

It is observed that the Microgel C exhibits an adsorption and a flocculating power which are superior to those of the Microgel A which indicates a greater ability to retain the sand. On the other hand, the high levels for Rm, Rkw and Rko indicate a reduced injectivity in comparison with the Microgel A in a sandstone of medium permeability.

EXAMPLE 9

Evaluation of the Properties of the Microgels Starting from the Inverse Microlatex Prepared According to Example 3

The microgel under consideration, referred to as Microgel D (of small size), was subjected to comparative tests with the Microgel A (with a similar chemical composition but of greater size). To do this, an injection into Berea sandstone was carried out according to the experimental protocol described in example 7 and a flocculation test was carried out on crushed Berea sandstone. The results are collated in the following two tables.

| Test of injection into Berea sandstone | K (Darcy) | Adsorption (µg/g) | Rm | Rkw | Rko | H (µm) |
|---|---|---|---|---|---|---|
| Microgel A | 0.15 | 150 | 30 | 25 | 1.2 | 1.4 |
| Microgel D | 0.15 | 50 | 4 | 1.2 | 1.0 | 0.3 |

| Flocculation test | Time for separation by settling (second) |
|---|---|
| Blank | 83 |
| Microgel A | 7 |
| Microgel D | 17 |

It is observed that the Microgel D exhibits an adsorption and a flocculating power which are lower than those of the Microgel A, which indicates a poorer ability to retain the sand. On the other hand, the low levels for Rm, Rkw and Rko indicate a very good injectivity in comparison with the Microgel A in a sandstone of medium permeability.

What is claimed is:

1. A process for the treatment of underground or nonunderground rock formations, oil or gas producing wells, water injection wells targeted at flushing hydrocarbon, oil or gas reservoirs, mine gas wells or gas storage wells, comprising injecting onto or into said rock formation, or into said well, a microgel obtained by diluting, in water, a self-invertible inverse latex or a self-invertible inverse microlatex, of a crosslinked polyelectrolyte, the polyelectrolyte obtained by copolymerization, in the presence of a crosslinking agent, of:
   (i) free, partially salified or completely salified 2-methyl-2-[(1-oxo-2-propenyl)amino]-1-propanesulfonic acid (AMPS),
   (ii) at least one cationic monomer selected from the group consisting of 2,N,N,N-tetramethyl-2-[(1-oxo-2-propenyl)amino]propanammonium chloride, N,N,N-trimethyl-3-[(1-oxo-2-propenyl)amino]propanammonium chloride, diallyldimethylammonium chloride, N,N,N-trimethyl-2-[(1-oxo-2-propenyl)]ethanammonium chloride, N,N,N-trimethyl-2-[(1-oxo-2-methyl-2-propenyl)]ethanammonium chloride and N,N,N-trimethyl-3-[(1-oxo-2-methyl-2-propenyl)amino]propanammonium chloride, and
   (iii) at least one neutral monomer selected from the group consisting of acrylamide, N,N-dimethylacrylamide, N-[2-hydroxy-1,1-bis(hydroxymethyl)ethyl]propenamide and 2-hydroxyethyl acrylate.

2. A self-invertible inverse latex, comprising from 20 to 70% by weight of a crosslinked polyelectrolyte obtained by copolymerization of:
   (i) free, partially salified or completely salified 2-methyl-2-[(1-oxo-2-propenyl)amino]-1-propanesulfonic acid (AMPS),
   (ii) N,N,N-trimethyl-3-[(1-oxo-2-propenyl)amino]propanammonium chloride (APTAC), and
   (iii) at least one neutral monomer selected from the group consisting of acrylamide, N,N-dimethylacrylamide, N-[2-hydroxy-1,1-bis(hydroxymethyl)ethyl]propenamide and 2-hydroxyethyl acrylate.

3. A self-invertible inverse microlatex, comprising from 15 to 40% by weight of a crosslinked polyelectrolyte obtained by copolymerization of:

(i) free, partially salified or completely salified 2-methyl-2-[(1-oxo-2-propenyl)amino]-1-propanesulfonic acid (AMPS),
(ii) N,N,N-trimethyl-3-[(1-oxo-2-propenyl)amino]propanammonium chloride (APTAC), and
(iii) at least one neutral monomer selected from the group consisting of acrylamide, N,N-dimethylacrylamide, N-[2-hydroxy-1,1-bis(hydroxymethyl)ethyl]propenamide and 2-hydroxyethyl acrylate.

4. The crosslinked self-invertible inverse latex as defined in claim 2, wherein the proportion of 2-methyl-2-[(1-oxo-2-propenyl)amino]-1-propanesulfonic acid monomer unit in the crosslinked polyelectrolyte is between 1 and 75 mol %.

5. The self-invertible inverse latex as defined in claim 4, wherein the proportion of 2-methyl-2-[(1-oxo-2-propenyl)amino]-1-propanesulfonic acid monomer unit in the crosslinked polyelectrolyte is between 5 and 40 mol %.

6. The self-invertible inverse latex as defined in claim 2, wherein the proportion of neutral monomer unit in the crosslinked polyelectrolyte is between 10 and 90 mol %.

7. The self-invertible inverse latex as defined in claim 6, wherein the proportion of neutral monomer unit in the crosslinked polyelectrolyte is between 50 and 70 mol %.

8. The self-invertible inverse latex as defined in claim 2, wherein the proportion of APTAC in the crosslinked polyelectrolyte is between 1 and 75 mol %.

9. The self-invertible inverse latex as defined in claim 2, wherein the proportion of APTAC in the crosslinked polyelectrolyte is between 3 and 30 mol %.

10. The self-invertible inverse latex as defined in claim 2, wherein the crosslinked polyelectrolyte comprises:
    a crosslinked terpolymer of AMPS, partially or completely salified in a sodium salt form,
    acrylamide, and
    APTAC.

11. A process for the preparation of microgels, comprising diluting in water the self-invertible inverse latex as defined in claim 2.

12. A process for the treatment of underground or nonunderground rock formations, oil or gas producing wells, water injection wells targeted at flushing hydrocarbon, oil or gas reservoirs, mine gas wells or gas storage wells, comprising injecting into or onto said rock formation, or into said well, a microgel obtained by dilution in water of the self-invertible inverse latex as defined in claim 2.

13. The self-invertible inverse microlatex as defined in claim 3, wherein the proportion of free 2-methyl-2-[(1-oxo-2-propenyl)amino]-1-propanesulfonic acid monomer unit in the crosslinked polyelectrolyte is between 1 and 75 mol %.

14. The self-invertible inverse microlatex as defined in claim 3, wherein the proportion of neutral monomer unit in the crosslinked polyelectrolyte is between 10 and 90 mol %.

15. The self-invertible inverse microlatex as defined in claim 3, wherein the proportion of APTAC in the crosslinked polyelectrolyte is between 1 and 75 mol %.

16. The self-invertible inverse microlatex as defined in claim 3, wherein the crosslinked polyelectrolyte comprises:
    a crosslinked terpolymer of AMPS, partially or completely salified in a sodium salt form,
    acrylamide, and
    APTAC.

17. A process for the preparation of microgels, comprising diluting in water the self-invertible inverse microlatex as defined in claim 3.

18. A process for the treatment of underground or nonunderground rock formations, oil or gas producing wells, water injection wells targeted at flushing hydrocarbon, oil or gas reservoirs, mine gas wells or gas storage wells, comprising injecting into or onto said rock formation, or into said well, a microgel obtained by dilution in water of the self-invertible inverse microlatex as defined in claim 3.

19. The self-invertible inverse latex as defined in claim 2, comprising from 25 to 60% by weight of the crosslinked polyelectrolyte.

20. The self-invertible inverse microlatex as defined in claim 3, comprising from 20 to 30% by weight of the crosslinked polyelectrolyte.

\* \* \* \* \*

UNITED STATES PATENT AND TRADEMARK OFFICE
CERTIFICATE OF CORRECTION

PATENT NO.       : 8,680,028 B2                                             Page 1 of 1
APPLICATION NO. : 12/997144
DATED            : March 25, 2014
INVENTOR(S)      : Braun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 376 days.

Signed and Sealed this

Twenty-ninth Day of September, 2015

Michelle K. Lee
*Director of the United States Patent and Trademark Office*